UNITED STATES PATENT OFFICE.

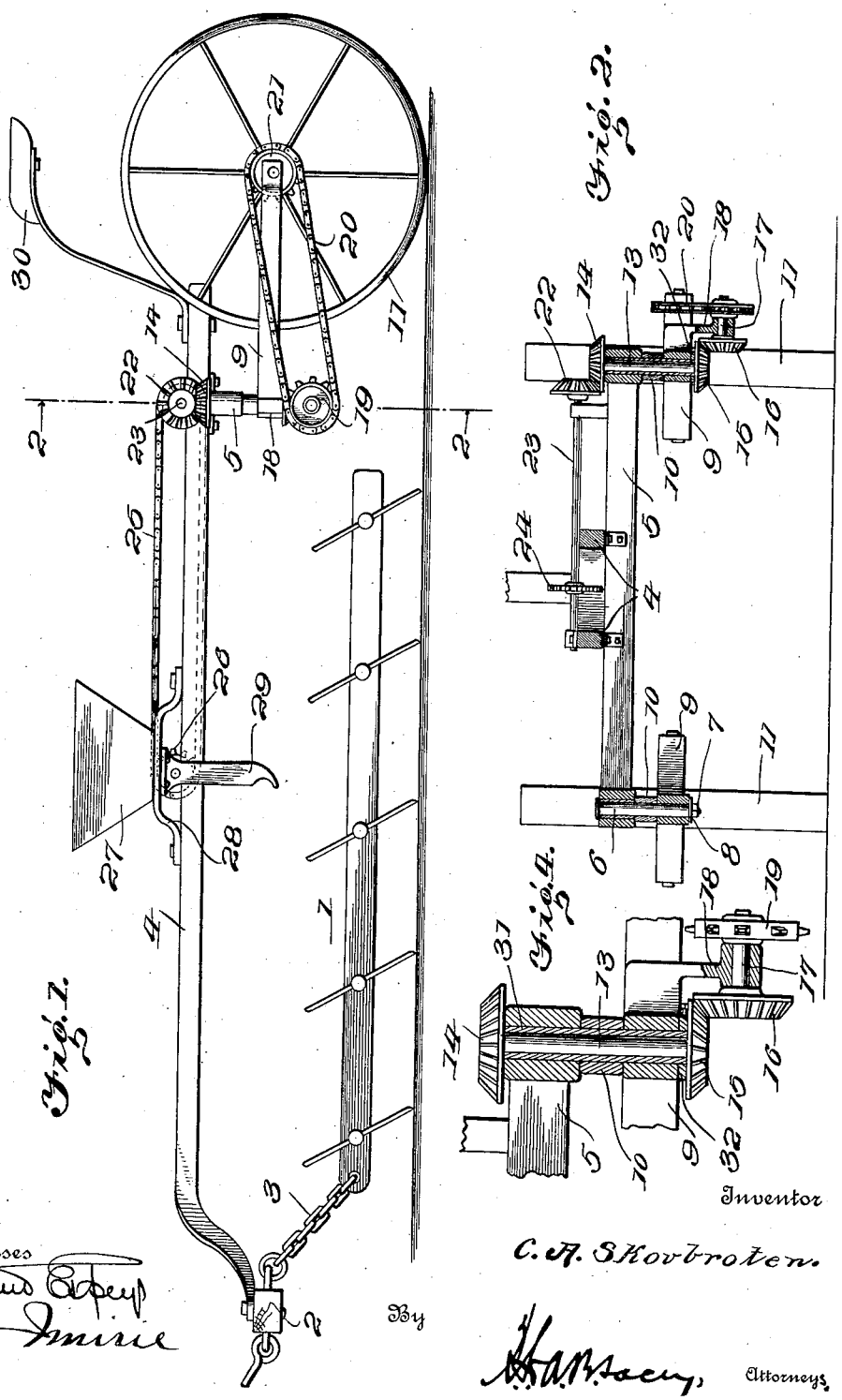

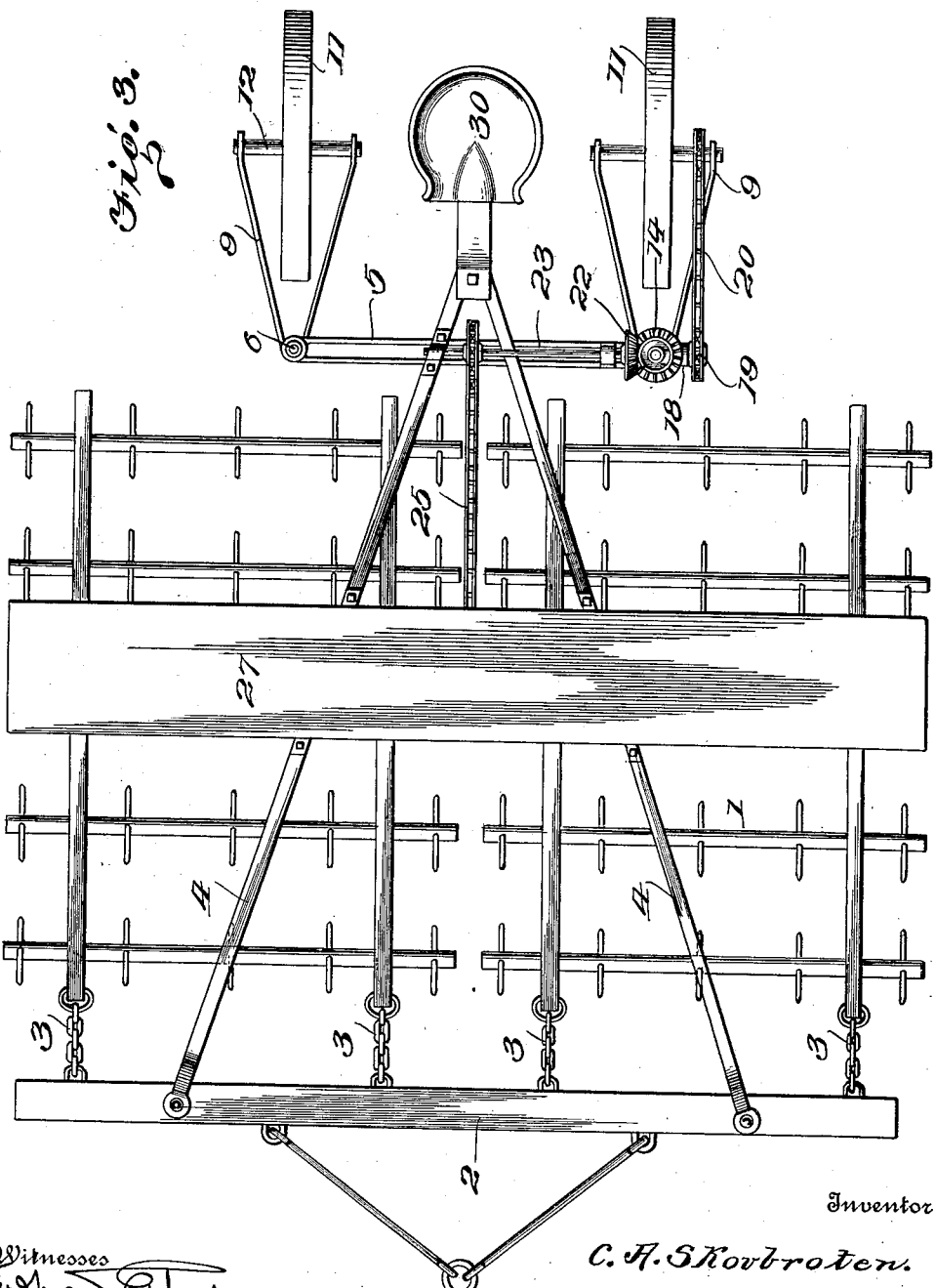

CHRISTIAN A. SKOVBROTEN, OF MONDOVI, WISCONSIN.

ATTACHMENT FOR HARROWS.

1,101,151.  Specification of Letters Patent.  Patented June 23, 1914.

Application filed April 8, 1913. Serial No. 759,759.

*To all whom it may concern:*

Be it known that I, CHRISTIAN A. SKOVBROTEN, a citizen of the United States, residing at Mondovi, in the county of Buffalo and State of Wisconsin, have invented certain new and useful Improvements in Attachments for Harrows, of which the following is a specification.

This invention relates to attachments for harrows, and has for its object the provision of simple and efficient mechanism whereby seed may be planted or fertilizer distributed simultaneously with the operation of pulverizing and turning the top soil.

The apparatus is intended more particularly for planting grass seed but may be utilized for other purposes.

The invention also has for its object the provision of a carriage which will constitute the prime motor for the planting or distributing mechanism and which will automatically aline itself with the harrow whether the same is being drawn forward in a straight line or is turning a corner.

The several objects of the invention are attained in the use of such a mechanism as is illustrated in the accompanying drawings, and the invention consists in certain novel features which will be hereinafter first fully described and then more particularly pointed out in the claim.

In the drawings: Figure 1 is a side elevation of my improved mechanism showing it connected to a drag harrow; Fig. 2 is a transverse section on the line 2—2 of Fig. 1; Fig. 3 is a plan view of the apparatus; Fig. 4 is an enlarged detail vertical section of a portion of the gearing.

The harrow indicated at 1 may be of any preferred form and is illustrated as consisting of two complete sections connected to a draw bar 2 by chains or other flexible connections 3. In applying my attachment to the harrow, I employ two main beams or bars 4 and secure the front ends of these main beams or bars to the draw bar 2, the said bars converging rearwardly and having their rear ends united at a point in rear of the harrow, as clearly shown in Figs. 1 and 3. To the said beams or bars 4, near the rear ends thereof, I secure a cross bar or beam 5, in the extremities of which are mounted pivots to support the ground wheels. At one side of the frame the pivot is in the form of a bolt 6 having a headed upper end whereby it will be prevented from dropping through the end of the cross bar and having its lower end equipped with a nut 7 and a washer 8 whereby the caster frame 9 will be prevented from dropping off the bolt. A spacing ring or collar 10 is fitted around the pivot between the cross bar and the caster frame so as to maintain the proper relative positions of the frame and the bar. The caster frame 9 is in the form of rearwardly diverging side bars and the ground wheel 11 has its axle 12 mounted in and extending between the rear ends of the said frame.

At the opposite end of the cross bar 5, the pivot consists of a sleeve or tube 31 which forms a bearing for a vertical shaft 13 equipped with bevel pinions 14 and 15 at its upper and lower ends. The upper end of the tube 31 is secured in the cross bar 5 in any convenient manner and a collar 32 is secured to the lower end of the tube to prevent dropping of the caster frame.

The tube 31, it will be noted, serves as a pivot for the caster frame and also as a reinforcement for the shaft 13 so as to relieve the same of all twisting or bending strain. The bevel pinion 15 at the lower end of the shaft 13 meshes with a bevel pinion 16 which is rigid with a shaft 17 journaled in an arm 18 on the caster frame and having a sprocket wheel 19 on its outer end. A sprocket chain 20 is trained around the said sprocket wheel 19 and a sprocket pinion 21 rigid with the axle of the adjacent ground wheel so that, as the harrow is drawn over the field, the attachment will be caused to move with it and the wheels rotated so as to transmit motion through the described sprocket gearing to the vertical shaft 13. The pinion 14 at the upper end of said shaft meshes with a similar pinion 22 on the outer end of a shaft 23 which is mounted in suitable bearings upon the cross bar and one of the rearwardly converging main beams or bars 4 and is equipped between the said main beams with a sprocket wheel 24. A sprocket chain 25 is trained around the said sprocket wheel and a similar sprocket wheel 26 forming a part of the seed dropping mechanism. This seed dropping mechanism is mounted in the bottom of a hopper 27 and may be of any ordinary or preferred type, being illustrated only conventionally in the drawing, as the particular construction and arrangement of its parts forms no part of my present invention.

The hopper 27 is supported upon brackets 28 which are secured upon the main beams or bars 4 and may be attached at any desired point along the said bars so that the seed may be deposited at the proper distance in advance of the rear end of the harrow. Spreaders 29 are secured to and depend from the hopper so that the seed fed from the hopper through the distributing mechanism will be caused to spread and scatter over the ground. A driver's seat 30 is supported upon the rear ends of the bars or beams 4, as shown and as will be readily understood.

It will be readily seen from the foregoing description, taken in connection with the accompanying drawings, that I have provided a very simple attachment for harrows whereby seed may be planted or fertilizer distributed as the harrow is drawn over the field. By shifting the hopper forwardly or rearwardly a greater or less number of harrow teeth may be permitted to take into the ground in rear of the seed deposited so that more or less of the soil will be stirred up and, consequently, the seed given a heavier or lighter covering. The attachment may thus be easily adapted to the particular seed being planted. The caster frames 9 being loosely suspended from the cross bar 5, the wheels mounted in said frame will automatically accommodate themselves to the line of draft so that they will always be in alinement with the harrow and the shifting of the said frames will not disengage the operating gearing, inasmuch as the gearing will swing concentrically with the pivot of the caster frame.

If the hopper and distributing mechanism be removed, the attachment may be utilized to convert a walking harrow into a riding harrow.

My improved attachment is composed of very few parts and these parts are simple in their construction and arrangement so that they are not apt to get out of order and will not materially increase the strain upon the draft animals.

The attachment may be applied to any ordinary toothed harrow and will not necessitate any rearrangement of its parts or interfere in any way with its ordinary operation.

What I claim is:—

An attachment for harrows comprising a main frame adapted to extend over a harrow and be connected with the front end thereof, a cross bar secured to said frame at the rear thereof and projecting laterally beyond the sides of the frame, a hopper on the main frame, seed distributing mechanism in said hopper including a sprocket wheel, a vertically disposed shaft journaled in the end of the cross bar, a transverse shaft journaled upon the main frame and the said cross bar adjacent the said vertical shaft, a sprocket wheel on the said transverse shaft, a sprocket chain connecting said sprocket wheel with the sprocket wheel in the seed distributing mechanism, a sleeve fitting around the vertical shaft and secured in the end of the cross bar, a collar secured to the lower end of said sleeve, a caster frame swiveled upon said sleeve above said collar, a spacing ring fitting around said sleeve between the caster frame and the end of the cross bar, an arm extending laterally from the front end of the caster frame, a shaft journaled in said arm and geared to the vertical shaft, a caster wheel carried by the rear end of the said caster frame, and gearing connecting the caster wheel with the last-mentioned shaft.

In testimony whereof I affix my signature in presence of two witnesses.

CHRIS. A. SKOVBROTEN.

Witnesses:
AUSTIN WHITE,
E. T. KOLSTAD.